US007103986B1

(12) United States Patent
Friggstad

(10) Patent No.: US 7,103,986 B1
(45) Date of Patent: Sep. 12, 2006

(54) ADJUSTABLE AGRICULTURAL MARKER SYSTEM AND METHOD OF MANUFACTURE

(75) Inventor: Terrance Friggstad, Grasswood (CA)

(73) Assignee: CNH Canada, Ltd., Racine, WI (US)

( * ) Notice: Subject to any disclaimer, the term of this patent is extended or adjusted under 35 U.S.C. 154(b) by 0 days.

(21) Appl. No.: 11/187,990

(22) Filed: Jul. 22, 2005

(51) Int. Cl.
*A01B 69/02* (2006.01)
*A01B 73/02* (2006.01)

(52) U.S. Cl. ............................ 33/624; 33/264; 33/1 H; 172/126; 172/128

(58) Field of Classification Search .......... 33/263–264, 33/624, 1 H, 521; 172/126, 128
See application file for complete search history.

(56) References Cited

U.S. PATENT DOCUMENTS

| 1,076,358 | A |   | 10/1913 | Foreman |   |
|---|---|---|---|---|---|
| 2,725,814 | A |   | 12/1955 | Watmough |   |
| 2,850,958 | A |   | 9/1958 | Robinson |   |
| 3,762,482 | A |   | 10/1973 | Johnson |   |
| 3,766,987 | A |   | 10/1973 | Orthman |   |
| 3,833,066 | A |   | 9/1974 | Hitt |   |
| 4,011,914 | A |   | 3/1977 | Elmer |   |
| 4,365,672 | A |   | 12/1982 | Robinson, Jr. et al. |   |
| 4,520,875 | A |   | 6/1985 | Deckler |   |
| 4,526,236 | A |   | 7/1985 | Jacobsen |   |
| 4,583,598 | A |   | 4/1986 | Knels |   |
| 4,674,578 | A |   | 6/1987 | Bexten et al. |   |
| 5,379,847 | A | * | 1/1995 | Snyder | 172/128 |
| 5,408,756 | A | * | 4/1995 | Wahls | 33/624 |
| 5,425,427 | A |   | 6/1995 | Haugen |   |
| 5,887,663 | A |   | 3/1999 | Williams |   |
| 6,079,114 | A | * | 6/2000 | Toews | 33/624 |
| 6,125,944 | A | * | 10/2000 | Redekop | 33/624 |
| 6,141,612 | A |   | 10/2000 | Flamme et al. |   |
| 6,202,756 | B1 | * | 3/2001 | Hundeby et al. | 172/311 |
| 6,334,491 | B1 | * | 1/2002 | Nevin | 172/126 |
| 6,708,775 | B1 | * | 3/2004 | Beaujot | 172/126 |
| 2002/0189826 | A1 |   | 12/2002 | Beaujot |   |

* cited by examiner

*Primary Examiner*—Yaritza Guadalupe-McCall
(74) *Attorney, Agent, or Firm*—Rebecca Henkel

(57) ABSTRACT

An agricultural marker assembly is disclosed for use with a marker arm that extends from an agricultural vehicle wherein the vehicle moves along a primary travel direction during operation. The assembly includes an extension assembly including at least first and second members, each of the first and second members having first and second ends, the first member supported by the arm and extending generally in the direction opposite the primary travel direction, the second member supported by a first portion of the first member and extending at least in part away from the first portion of the first member along a trajectory lateral to the primary travel direction when the vehicle is moving in the primary travel direction. The assembly also includes a marker supported by the second member and separated from the first portion of the first member. Furthermore, at least one of the first member is supported by the arm for pivotal motion about a substantially vertical axis, the second member is supported by the first member for pivotal motion about a substantially vertical axis, and the marker is supported by the second member for pivotal motion about a substantially vertical axis.

20 Claims, 4 Drawing Sheets

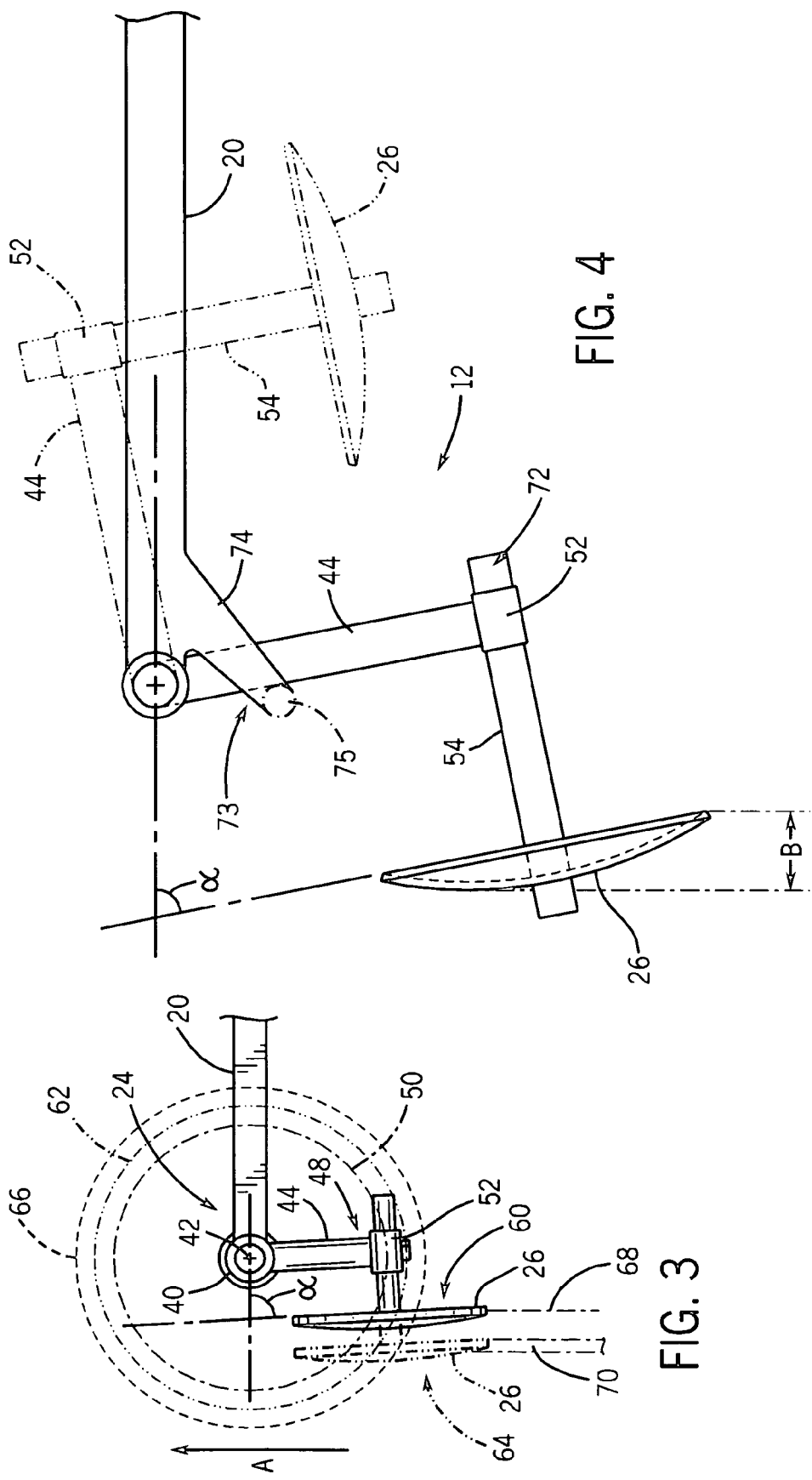

ADJUSTABLE AGRICULTURAL MARKER SYSTEM AND METHOD OF MANUFACTURE

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

The present invention relates generally to agricultural systems and, more particularly, to a system and method for an adjustable agricultural marker.

Agricultural vehicles such as tractors and combines are mainstays within the agricultural industry. As an agricultural vehicle travels across a field, agricultural processes such as tilling, planting, and/or fertilizing are performed by an implement associated with the vehicle. In many cases an implement will be relatively long and extend laterally from the center thereof and from the location of a tractor operator such that it is difficult for the operator to accurately align the end of an implement with the near edge of a strip of the field that has already been processed (e.g., fertilized, tilled, etc.).

In at least some cases the implement aligning process is overcome by providing marker subassemblies. To this end, a typical marker subassembly includes a long extension arm that extends from the lateral end of an implement and a coulter that extends downward from the distal end of the arm to the soil therebelow. The arm length is typically approximately one half the width of the implement such that, as the coulter moves across the soil therebelow, the coulter scribes a line through the field that can be used by the tractor operator during a subsequent pass through the field to align the end of the implement with the edge of the strip in the field most recently processed. During the next pass, the operator aligns the tractor along the scribed lien and another marker sub-assembly scribes another line while the implement continues to process another field strip.

While the markers create an identifiable border to aid in traversing the field in a systematic row-by-row format, traditional fixed marker designs must be raised and lowered as the vehicle performs turns. That is, if a traditional fixed marker remains engaged with a field during a turn, the marker is subjected to considerable stress and strain that can damage the field and/or the maker subassembly. Marker raising and lowering is a tedious and time consuming task.

Additionally, when changing between operations or when moving between areas in a field or between fields having varying ground conditions, it is often desirable to match the mark created to the specific task being performed and the specific conditions of the field. For example, some applications and/or field conditions make it desirable to create a mark that is less disturbing to the ground while at other times it may be desirable create a mark that is more clearly identifiable and will not be inadvertently confused with other marks in the field.

BRIEF SUMMARY OF THE INVENTION

The present invention overcomes the aforementioned drawbacks by providing an adjustable marker system. In particular, the marker system is capable of separate adjustments to allow the marker to remain lowered during turns and to produce a marking characteristic matched to the desired operational marking requirements or field conditions. The functionality of marker system is further enhanced by offsetting the marker position from an axis of rotation.

In accordance with one aspect of the invention, an agricultural marker assembly for use with a marker arm is disclosed that extends from an agricultural vehicle wherein the vehicle moves along a primary travel direction during operation. The assembly includes an extension assembly including at least first and second members, each of the first and second members having first and second ends, the first member supported by the arm and extending generally in the direction opposite the primary travel direction, the second member supported by a first portion of the first member and extending at least in part away from the first portion of the first member along a trajectory lateral to the primary travel direction when the vehicle is moving in the primary travel direction. The assembly also includes a marker supported by the second member and separated from the first portion of the first member. Furthermore, at least one of the first member is supported by the arm for pivotal motion about a substantially vertical axis, the second member is supported by the first member for pivotal motion about a substantially vertical axis, and the marker is supported by the second member for pivotal motion about a substantially vertical axis.

The marker may also be supported by the second member to allow relative motion therebetween to adjust separation of the marker from the first portion of the first member.

Furthermore, the marker may be configured to increase marking visibility as the separation of the marker from the first portion of the first member is increased.

The assembly may also include an adjustable fastener disposed at the first portion of the first member to engage the second member at any of a plurality of positions therealong.

Additionally, the adjustable fastener may include a sleeve configured to receive the second member therethrough and a clamping system configured to tighten the sleeve around the second member.

The assembly may also include a caster configured to permit at least one of the first member, the second member, and the marker to pivot about the substantially vertical axis as the agricultural vehicle deviates from the primary travel direction.

Furthermore, the assembly may include a rotational stopper configured to restrict pivotal motion of at least one of the first member, the second member, and the marker about a substantially vertical axis when the agricultural vehicle deviates from the primary travel direction in a direction away from the marker arm.

In this regard, the stopper may be configured to allow pivotal motion of at least one of the first member, the second member, and the marker about the substantially vertical axis toward the marker arm when the agricultural vehicle deviates from the primary travel direction in direction toward the marker arm.

Additionally, an angle formed between the marker and the arm when the vehicle is moving in the primary travel direction may be configured to be changed by adjusting separation of the marker from the first portion of the first member.

Furthermore, the angle formed between the marker and the arm when the vehicle is moving in the primary travel direction may be configured to decrease as the separation of the marker from the first portion of the first member is increased.

The assembly may also include an incrementally adjustable caster supported by the first member to adjust an angle formed between the marker and the arm when the vehicle is moving in the primary travel direction.

In accordance with another aspect of the invention, an agricultural marker assembly for use with a marker arm is disclosed that extends from an agricultural vehicle wherein the vehicle moves along a primary travel direction during operation. The assembly includes an extension assembly including at least a first member having first and second ends, the first member supported by the arm for pivotal motion about a substantially vertical axis and extending generally in the direction opposite the primary travel direction when the vehicle is moving in the primary travel direction. The assembly also includes a marker and a fastener for mounting the marker to the first member at different relative juxtapositions such that, as the marker is pulled through a field along the primary travel direction and engages the field, forces on the marker cause the marker to assume an angle with respect to the arm that is a function of the relative juxtaposition of the marker with respect to the first member.

The assembly may also include a second member connecting the marker and the first member through the fastener and extending generally lateral to the primary travel direction when the marker is pulled in the primary travel direction.

Additionally, the marker may be configured to generate an increased mark on the field as the relative juxtaposition of the marker and the first member is increased.

Furthermore, the assembly may include a caster to allow pivotal motion of at least one of the first member and the marker about the substantially vertical axis.

The assembly may also include a stop supported by the marker arm to permit pivotal motion of at least one of the first member and the marker in a direction induced when the vehicle turns toward the arm from the primary travel direction and configured to restrict pivotal motion of at least one of the first member and the marker in a direction induced when the vehicle turns away from the arm from the primary travel direction.

The assembly may also include an incrementally adjustable caster configured to adjust an angle formed between the marker and the arm when the vehicle is moving in the primary travel direction.

In accordance with yet another aspect of the invention, a method of manufacturing an agricultural marker assembly is disclosed for use with a marker arm that extends from an agricultural vehicle wherein the vehicle moves along a primary travel direction during operation. The method includes providing an extension assembly including at least first and second members, each of the first and second members having first and second ends. The method also includes supporting the first member by the arm to extend generally in the direction opposite the primary travel direction and supporting the second member by a first portion of the first member to extend at least in part away from the first portion of the first member along a trajectory generally lateral to the primary travel direction when the vehicle is moving in the primary travel direction. Additionally, the method includes supporting a marker by the second member, separating the marker from the first portion of the first member, and pivotally supporting at least one of the first member by the arm for pivotal motion about a substantially vertical axis, the second member by the first member for pivotal motion about a substantially vertical axis, and the marker by the second member for pivotal motion about a substantially vertical axis.

The method may also include supporting an adjustable rotational stop by the arm to hold at least one of the first member and the second member at a position when the vehicle is moving in the primary travel direction that creates an acute angle between the marker and the arm.

Additionally, the method may include connecting a caster between at least two of the arm, the first member, the second member, and the marker to allow pivotal motion therebetween.

Various other features of the present invention will be made apparent from the following detailed description and the drawings.

BRIEF DESCRIPTION OF THE DRAWINGS

Reference is hereby made to the following drawings in which like reference numerals correspond to like elements throughout, and in which:

FIG. 3 is a top plan view of the portion of the marker system of FIG. 2;

FIG. 4 is a plan view of a portion of a marker system that includes a rotational stop in accordance with one aspect of the present invention;

DETAILED DESCRIPTION

Figure 1:
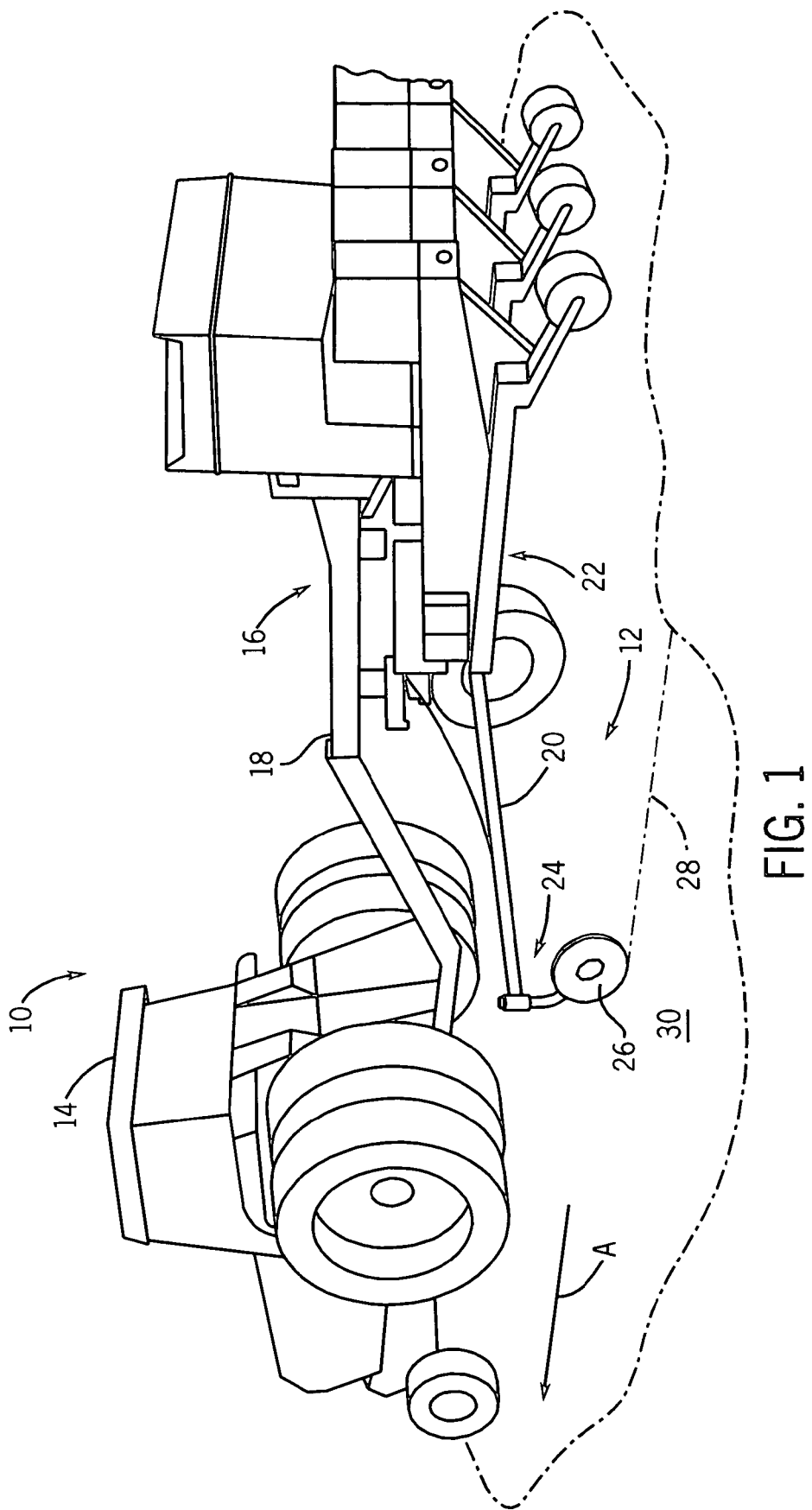
FIG. 1 is a perspective view of an exemplary agricultural vehicle that pulls an implement that includes a marker system in accordance with the present invention.

Referring to FIG. 1, an agricultural vehicle 10 incorporating a marker system 12 in accordance with the present invention is shown. Specifically, the agricultural vehicle 10 shown includes a tractor 14 configured to tow a multi-row agricultural implement 16 via a tow bar 18. While the agricultural vehicle 10 is shown as including tractor 14 and associated towable agricultural implement 16, marker system 12 is equivalently operable with combination or "combine" agricultural vehicles or other agricultural vehicles or implements that can be utilized with traditional marker systems.

Marker system 12 includes a marker arm 20 that is shown as extending laterally from towable agricultural implement 16. However, marker arm 20 may equivalently extend from tractor 14 or other portion of agricultural vehicle 10. Hereinafter, unless indicated otherwise, the phrase "agricultural vehicle" will be used generally to refer to a prime mover such as a tractor or an implement that is pulled or pushed by a prime mover. Marker arm 20 extends from a first end 22 that engages agricultural vehicle 10 to a second end 24 where a marker 26 is, as will be described, adjustably engaged. Therefore, as shown, marker arm 20 extends from agricultural vehicle 10 in a direction substantially transverse to a primary direction of travel, denoted by arrow A. Accordingly, as tractor 14 tows agricultural implement 16 in the primary direction of travel A, marker 26 is pulled in the primary direction of travel A. As such, as marker 26 is pulled in the primary direction of travel A, a mark 28 is formed in a field surface 30 over which agricultural vehicle 10 is traversing.

Figure 2:
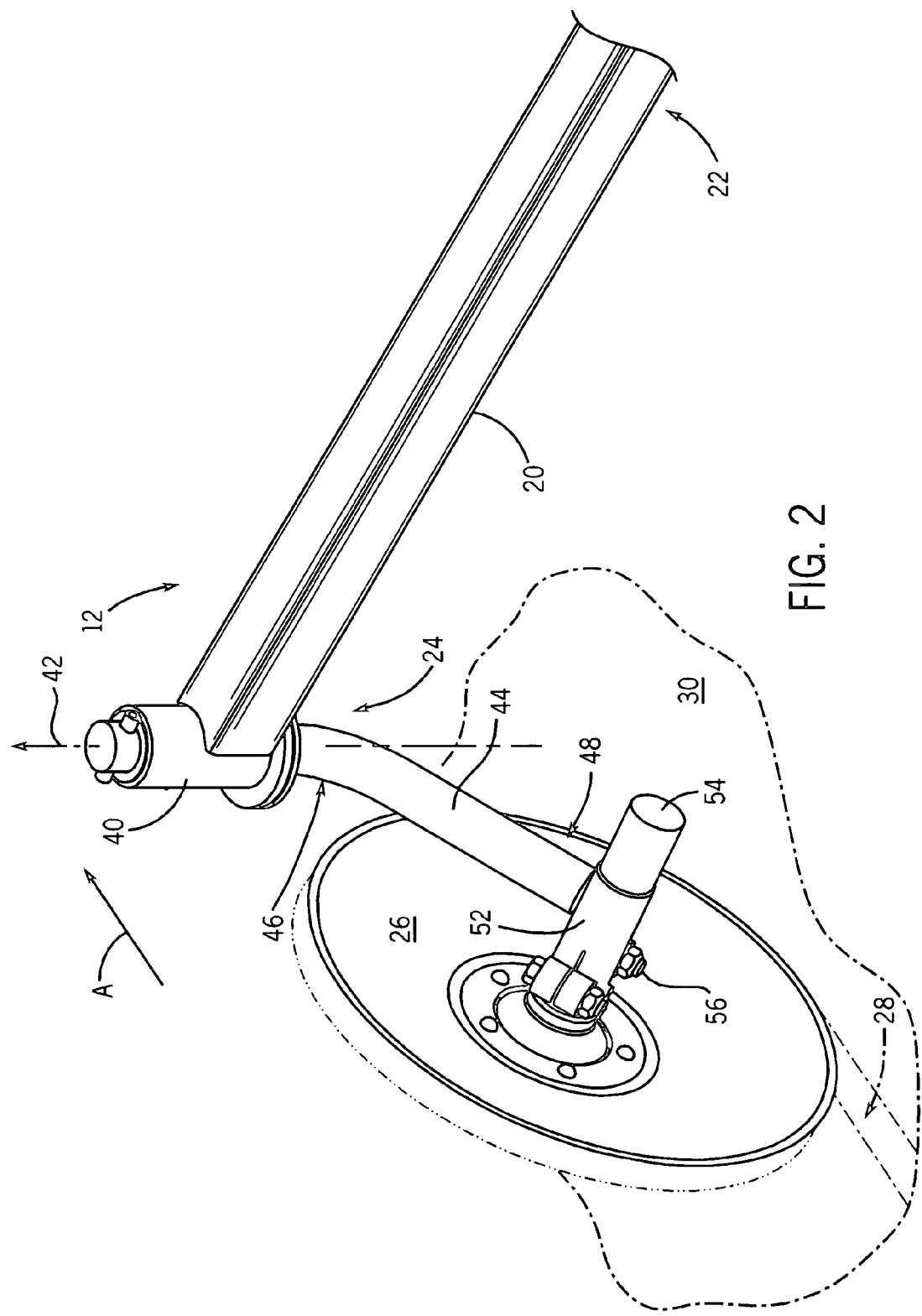
FIG. 2 is a perspective view of a portion of the marker system of FIG. 1 in accordance with the present invention.

Referring now to FIGS. 2 and 3, a detailed perspective view of second end 24 of marker system 12, arranged in accordance with one embodiment of the present invention, is shown. Marker system 12 includes marker arm 20 that extends from first end 22 configured to engage an agricultural vehicle (not shown) to second end 24 substantially opposite first end 22. Disposed at the second end 24 is a caster 40. Caster 40 is aligned at second end 24 of marker arm 20 to create a substantially vertical rotational axis 42 that is substantially perpendicular to the primary direction of travel A.

A first member or shaft 44 engages caster 40 at a first end 46 to permit rotation of shaft 44 about rotational axis 42. Shaft 44 extends from first end 46, away from rotational axis 42, to second end 48 of shaft 44. As best shown in FIG. 3, when shaft 44 is rotated about rotational axis 42, second end 48 is drawn around a rotational circumference 50 surrounding rotational axis 42.

Continuing with respect to FIGS. 2 and 3, disposed at second end 48 of shaft 44 is a sleeve 52. Sleeve 52 is configured to receive a second member or extension bar 54 therethrough. Accordingly, extension bar 54 is configured to slide through sleeve 52 to a desired position and then be secured therein by tightening at least one user-adjustable fastener 56, such as a bolt or screw. Disposed at an end of extension bar 54 is a marker 26 in the form of a concave coulter disc. As such, marker 26 is offset from rotational axis 42, which, as will be described, further enhances the functionality of marker system 12.

In particular, referring still to FIGS. 2 and 3, when making a turn, the tractor operator may leave marker 26 down and engaged with field 30 and, as the direction of force upon marker 26 varies through the turn, marker 26, extension arm 54, and shaft 44 will rotate about rotational axis 42 as indicated by circumference 50. Thus, rather than being fixed with respect to marker arm 20, marker 26 is permitted, by connection through extension bar 54, adjustable fastener 52, and shaft 44 to caster 40, to rotate about rotational axis 42 in response to directional changes in the forces applied to marker 26. Accordingly, whether the directional changes in the forces applied to marker 26 are due to deviations from the primary direction of travel A, such as during a turn, or due to encountering obstructions within field 30, such as changes in terrain, the potential for damage to marker 26 or field 30 is reduced because marker 26 rotates about rotational axis 42 to reduce stresses associated with the directional changes in the forces applied to marker 26. Therefore, marker system 12 need not be raised from field 30 by the operator when performing a turn from the primary direction of travel A.

Referring still to FIGS. 2 and 3, when pulled in the primary direction of travel A, marker 26 is positioned behind and beyond second end 24 of marker arm 20 and caster 40 by a fixed distance created by the extent to which shaft 44 extends away from rotational axis 42 and the position of extension bar 54 within sleeve 52. In this regard, marker 26 is offset from second end 24 of marker arm 20 and caster 40 and rotational axis 42. The distance between marker 26 and caster 40 can be adjusted by way of sleeve 52 and fastener 56. That is, the distance of displacement of marker 26 from caster 40 can be adjusted by sliding extension bar 54 through sleeve 52 and tightening extension bar 54 therein by way of fastener 56.

Accordingly, as shown in FIG. 3, marker 26 may be moved between a first position 60 having a first rotational circumference 62 about rotational axis 42 and a second position 64 having a second rotational circumference 66 about rotational axis 42. While for exemplary purposes only first and second positions 60, 64 and associated rotational circumferences 62, 66 are shown, a wide variety of positions and associated rotational circumferences are possible because extension shaft 54 is not limited to any particular or discrete positions within sleeve 52.

Referring still to FIG. 3, it has been recognized that the characteristics of the mark (e.g., 68 or 70) formed by marker 26 as the marker 26 is pulled along the primary direction of travel A are directly related to an angle $\alpha$ formed between marker 26 and arm 20. Thus, where angle $\alpha$ is close to 90°, the width of the mark (e.g., 68) is relatively narrow. On the other hand, as angle $\alpha$ becomes progressively less than 90° (e.g., 80°), mark width (e.g., 70) becomes greater as more soil disturbance occurs.

It has been also recognized that angle $\alpha$ can be adjusted by changing the position of extension bar 54 within sleeve 52. In this regard, when extension bar 54 is slid into sleeve 52 so that marker 26 is immediately adjacent sleeve 52, as marker 26 is pulled through field 30, the forces on marker 26 tend to align marker 26 substantially perpendicular to arm 20 (i.e., marker 26 forms an approximately 90° angel with arm 20) and a narrow mark 68 is created. In contrast, when bar 54 is slid within sleeve 52 so that marker 26 is separated from sleeve 52 by a large space, forces on marker 26 tend to twist marker 26, extension bar 54, and shaft 44 about axis 42 so that the concave surface (i.e., the right side surface as illustrated in FIG. 3) faces the primary direction of travel A to a greater degree and a wider relative mark 70 is formed.

Accordingly, marker 26 may be dynamically adjusted to create marks having different characteristics or to create marks having similar characteristics despite different field conditions. As such, the mark or gouge 68, 70 created by the marker 26 can be easily adjusted to be sufficient to guide the operator from straying from a desired row-by-row traversal pattern without creating a mark that may be harmful to a field or plantings therein.

Referring now to FIG. 4, a marker systems 12 is shown with an optional rotational stop 73. System 12 in FIG. 4 is substantially similar to the marker system described with respect to FIGS. 2 and 3 and, thus, similar components share common identifiers. Beyond the components common to the marker system described with respect to FIGS. 2 and 3, marker system 12 of FIG. 4 includes rotational stop 73 that includes a stop arm 74 extending from marker arm 20 and a stop shaft 75 (shown in phantom) extending downward from the end of stop arm 74. Stop shaft 75 is designed to engage and limit shaft 44 rotation so that angle $\alpha$ of marker 26 with arm 20 has a maximum acute value. For instance, stop shaft 75 may cooperate with shaft 44 to limit angle $\alpha$ to a maximum of 80° in accordance with at least one embodiment. Thus, because mark characteristics are directly related to angle $\alpha$, stop 73 operates to ensure at least a minimum mark width while still allowing adjustment of marker 26 and arm 54 with respect to sleeve 52 to create marks having greater width dimensions.

Referring still to FIG. 4, rotational stop 73 is arranged to allow marker shaft 44 to rotate in a direction induced when the agricultural vehicle turns toward marker arm 20 from the primary direction of vehicle motion A. On the other hand, rotational stop 73 is designed to hold marker shaft 44 against rotation in a direction induced when the agricultural vehicle turns away marker arm 20 from the primary direction of vehicle motion A.

While rotational stop 73 is shown as having a fixed position, it is contemplated that rotational stop 73 may be adjustable. For example, stop shaft 75 may be removable such that stop shafts of varying circumference may be swapped to change maximum angle α. Additionally or alternatively, stop arm 74 may be adjustable such that the distance that stop arm 74 extends from marker arm 20 may be varied. Accordingly, the size and shape of the mark B may be varied by adjusting one or a combination of marker displacement, stopper size, stopper position, and the like.

Figure 6:
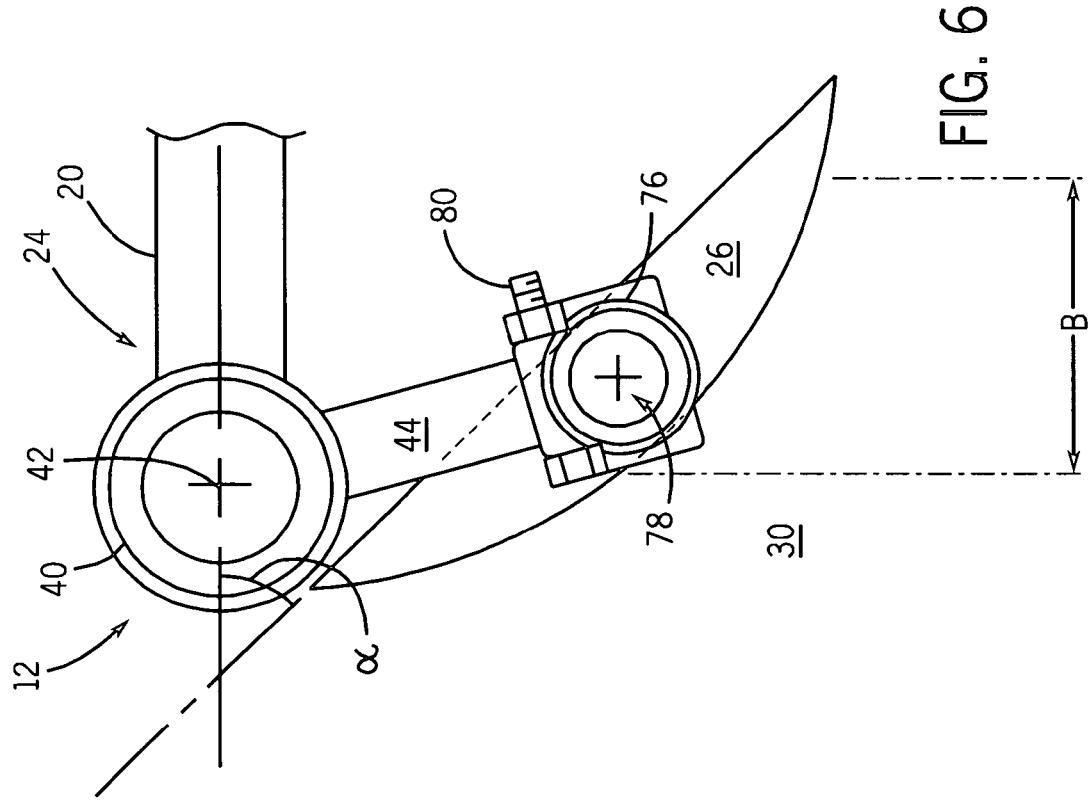
FIG. 6 is a plan view of the marker system of FIG. 5 showing an adjusted marker position and relative motion of the components of the marker system as the direction of motion deviates from a primary direction of travel.
Figure 5:
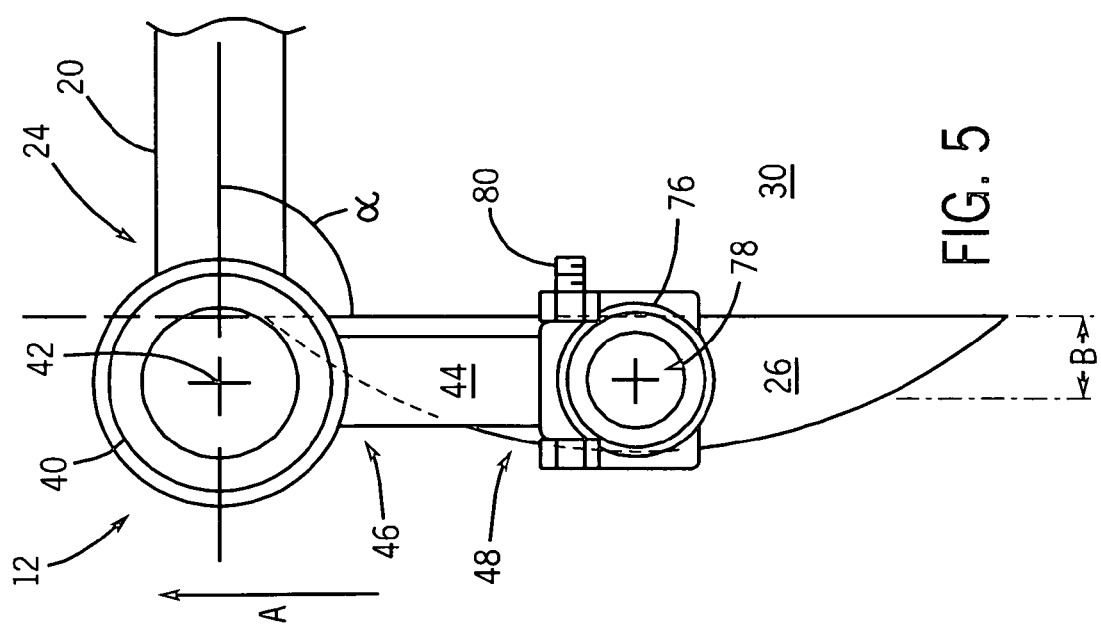
FIG. 5 is a plan view of a portion of a marker system in accordance with another aspect of the present invention.

Referring now to FIG. 5, a marker system 12, in accordance with another embodiment of the present invention, is shown. Again, as marker system 12 is related to the marker systems described with respect to FIGS. 1–4, like components share similar identifiers. However, according to the illustrated embodiment, a caster 76 is disposed at second end 48 of shaft 44 that, as will be described, is incrementally adjustable between a plurality of discrete positions. Marker 26 is connected in a known manner so as to pivot about a substantially vertical axis 78 of caster 76 as the rotational position of caster 75 is adjusted by an operator. In particular, a user adjust 80 is included that when engaged by an operator allows caster 76 and thereby marker 26 to rotate about substantially vertical axis 78 to one of a plurality of discrete positions. More particularly, it is contemplated that when user adjust 80 is not engaged, caster 78 cannot rotate about substantially vertical axis 78. Therefore, by engaging user adjust 80, caster 78 and marker 26 can be rotated about substantially vertical axis 78 to change angle α from an initial angle to an adjusted angle, as shown in FIG. 6. However, it should be noted that FIG. 6 not only shows marker 26 adjusted with respect to caster 78 and shaft 44 to reduce angle α but also shows angle α further reduced as results when the vehicle deviates from the primary direction of vehicle motion A. That is, as previously described with respect to FIGS. 3 and 4, shaft 44 will rotate so that angle α varies as the agricultural vehicle turns from the primary direction of vehicle motion A.

In any case, as shown in FIGS. 5 and 6, by engaging user adjust 80 to allow caster 76 to pivot, marker 26 can be incrementally pivoted about substantially vertical axis 78 to increase the characteristics of the mark as shown in the variation in width B. More particularly, as previously described, the characteristics of the mark formed by marker 26 as the marker 26 is pulled along the primary direction of travel A can be adjusted by changing angle α via caster 76. In this regard, as shown in FIG. 5, when marker 26 is aligned with shaft 44, angle α is close to 90° and the width of the mark B is relatively narrow. However, as shown in FIG. 6, when marker 26 is rotated via caster 76 about substantially vertical axis 78, angle α becomes progressively less than 90° and the width B of the resulting mark is increased as more soil disturbance occurs.

As stated before, as shown in FIG. 6, when the agricultural vehicle turns from the primary direction of vehicle motion A in a direction at least in part aligned with the length of arm 20, caster 40 permits shaft 44, caster 76, and marker 26 to rotate about substantially vertical axis 42. That is, rather than being fixed with respect to marker arm 20, marker 26 is permitted, by connection through caster 76 and shaft 44 to caster 40, to rotate about rotational axis 42 in response to directional changes in the forces applied to marker 26. Accordingly, whether the directional changes in the forces applied to marker 26 are due to deviations from the primary direction of travel A, such as during a turn, or due to encountering obstructions within a field, such as changes in terrain, the potential for damage to marker 26 or field 30 is reduced because marker 26 rotates about rotational axis 42 to reduce stresses associated with the directional changes in the forces applied to marker 26.

Again it should be noted that although under normal operational conditions the adjusted position of marker 26 through caster 76 would cause marker 26 and shaft 44 to rotate about vertical axis 42 to extend marker 26 away from second end 24 of marker arm 20, as shown, marker 26 has been forced toward second end 24 of marker arm 20 to decrease angle α due to either an obstruction in the field 30 or a change in direction from the primary direction of travel A. Therefore, as shown, marker system 12 need not be raised from field 30 by the operator when encountering an obstruction or performing a turn from the primary direction of travel A because marker 26 is free rotate about vertical axis 42 to alleviate stresses encountered due to the obstruction or turn.

It should be recognized that FIGS. 1–6 illustrate exemplary embodiments of the present invention and that changes to or combinations of the described embodiments are contemplated. For example, it is contemplated that the positions of the above-described rotational axes may be varied within the marker system. Furthermore, as described with respect to FIGS. 4–6, it is contemplated that rotational stops or discretely adjustable casters may be incorporated at a variety of positions in the marker system. Furthermore, though the above-described system shows that the position of the marker may be adjusted by sliding the arm with respect to the sleeve, it is also contemplated that the position of the marker may be adjusted by sliding the marker along the sleeve or the like.

Therefore, the present invention provides an agricultural marker system that is dynamically adjustable and responsive to changes in direction and impediments to travel such that the marker system may remain engaged with the field during turns and other directional changes without placing undue stress upon the marker system or field. Furthermore, the present invention provides a marker system that is adjustable to alter characteristics of marks created to compensate for field conditions, operational constraints, and/or accommodate user preference.

As such, one embodiment of the invention includes an agricultural marker assembly for use with a marker arm that extends from an agricultural vehicle wherein the vehicle moves along a primary travel direction during operation. The assembly includes an extension assembly including at least first and second members, each of the first and second members having first and second ends, the first member supported by the arm and extending generally in the direction opposite the primary travel direction, the second member supported by a first portion of the first member and extending at least in part away from the first portion of the first member along a trajectory lateral to the primary travel direction when the vehicle is moving in the primary travel direction. The assembly also includes a marker supported by the second member and separated from the first portion of the first member. Furthermore, at least one of the first member is supported by the arm for pivotal motion about a substantially vertical axis, the second member is supported by the first member for pivotal motion about a substantially vertical axis, and the marker is supported by the second member for pivotal motion about a substantially vertical axis.

Another embodiment of the invention includes an agricultural marker assembly for use with a marker arm that extends from an agricultural vehicle wherein the vehicle moves along a primary travel direction during operation. The assembly includes an extension assembly including at least a first member having first and second ends, the first member supported by the arm for pivotal motion about a substantially vertical axis and extending generally in the direction opposite the primary travel direction when the vehicle is moving in the primary travel direction. The assembly also includes a marker and a fastener for mounting the marker to the first member at different relative juxtapositions such that, as the marker is pulled through a field along the primary travel direction and engages the field, forces on the marker cause the marker to assume an angle with respect to the arm that is a function of the relative juxtaposition of the marker with respect to the first member.

A further embodiment of the invention includes a method of manufacturing an agricultural marker assembly for use with a marker arm that extends from an agricultural vehicle wherein the vehicle moves along a primary travel direction during operation. The method includes providing an extension assembly including at least first and second members, each of the first and second members having first and second ends. The method also includes supporting the first member by the arm to extend generally in the direction opposite the primary travel direction and supporting the second member by a first portion of the first member to extend at least in part away from the first portion of the first member along a trajectory generally lateral to the primary travel direction when the vehicle is moving in the primary travel direction. Additionally, the method includes supporting a marker by the second member, separating the marker from the first portion of the first member, and pivotally supporting at least one of the first member by the arm for pivotal motion about a substantially vertical axis, the second member by the first member for pivotal motion about a substantially vertical axis, and the marker by the second member for pivotal motion about a substantially vertical axis.

The present invention has been described in terms of the preferred embodiment, and it should be appreciated that many equivalents, alternatives, variations, and modifications, aside from those expressly stated, are possible and within the scope of the invention. Therefore, the invention should not be limited to a particular described embodiment.

I claim:

1. An agricultural marker assembly for use with a marker arm that extends from an agricultural vehicle wherein the vehicle moves along a primary travel direction during operation, the assembly comprising:
    an extension assembly including at least first and second members, each of the first and second members having first and second ends, the first member supported by the arm and extending generally in the direction opposite the primary travel direction, the second member supported by a first portion of the first member and extending at least in part away from the first portion of the first member along a trajectory lateral to the primary travel direction when the vehicle is moving in the primary travel direction;
    a marker supported by the second member and separated from the first portion of the first member; and
    wherein, at least one of the first member is supported by the arm for pivotal motion about a substantially vertical axis, the second member is supported by the first member for pivotal motion about a substantially vertical axis, and the marker is supported by the second member for pivotal motion about a substantially vertical axis.

2. The assembly of claim 1 wherein the marker is supported by the second member to allow relative motion therebetween to adjust separation of the marker from the first portion of the first member.

3. The assembly of claim 2 wherein the marker is configured to increase marking visibility as the separation of the marker from the first portion of the first member is increased.

4. The assembly of claim 2 further comprising an adjustable fastener disposed at the first portion of the first member to engage the second member at any of a plurality of positions therealong.

5. The assembly of claim 4 wherein the adjustable fastener includes a sleeve configured to receive the second member therethrough and a clamping system configured to tighten the sleeve around the second member.

6. The assembly of claim 1 further comprising a caster configured to permit at least one of the first member, the second member, and the marker to pivot about the substantially vertical axis as the agricultural vehicle deviates from the primary travel direction.

7. The assembly of claim 1 further comprising a rotational stopper configured to restrict pivotal motion of at least one of the first member, the second member, and the marker about a substantially vertical axis when the agricultural vehicle deviates from the primary travel direction in a direction away from the marker arm.

8. The assembly of claim 7 wherein the stopper is configured to allow pivotal motion of at least one of the first member, the second member, and the marker about the substantially vertical axis toward the marker arm when the agricultural vehicle deviates from the primary travel direction in direction toward the marker arm.

9. The assembly of claim 1 wherein an angle formed between the marker and the arm when the vehicle is moving in the primary travel direction is configured to be changed by adjusting separation of the marker from the first portion of the first member.

10. The assembly of claim 9 wherein the angle formed between the marker and the arm when the vehicle is moving in the primary travel direction is configured to decrease as the separation of the marker from the first portion of the first member is increased.

11. The assembly of claim 1 further comprising an incrementally adjustable caster supported by the first member to adjust an angle formed between the marker and the arm when the vehicle is moving in the primary travel direction.

12. An agricultural marker assembly for use with a marker arm that extends from an agricultural vehicle wherein the vehicle moves along a primary travel direction during operation, the assembly comprising:
    an extension assembly including at least a first member having first and second ends, the first member supported by the arm for pivotal motion about a substantially vertical axis and extending generally in the direction opposite the primary travel direction when the vehicle is moving in the primary travel direction;
    a marker; and
    a fastener for mounting the marker to the first member at different relative juxtapositions such that, as the marker is pulled through a field along the primary travel direction and engages the field, forces on the marker cause the marker to assume an angle with respect to the arm that is a function of the relative juxtaposition of the marker with respect to the first member.

13. The assembly of claim 12 further comprising a second member connecting the marker and the first member through the fastener and extending generally lateral to the primary travel direction when the marker is pulled in the primary travel direction.

14. The assembly of claim 12 wherein the marker is configured to generate an increased mark on the field as the relative juxtaposition of the marker and the first member is increased.

15. The assembly of claim 12 further comprising a caster to allow pivotal motion of at least one of the first member and the marker about the substantially vertical axis.

16. The assembly of claim 15 further comprising a stop supported by the marker arm to permit pivotal motion of at least one of the first member and the marker in a direction induced when the vehicle turns toward the arm from the primary travel direction and configured to restrict pivotal motion of at least one of the first member and the marker in a direction induced when the vehicle turns away from the arm from the primary travel direction.

17. The assembly of claim 12 further comprising an incrementally adjustable caster configured to adjust an angle formed between the marker and the arm when the vehicle is moving in the primary travel direction.

18. A method of manufacturing an agricultural marker assembly for use with a marker arm that extends from an agricultural vehicle wherein the vehicle moves along a primary travel direction during operation, the method comprising:

providing an extension assembly including at least first and second members, each of the first and second members having first and second ends;

supporting the first member by the arm to extend generally in the direction opposite the primary travel direction;

supporting the second member by a first portion of the first member to extend at least in part away from the first portion of the first member along a trajectory generally lateral to the primary travel direction when the vehicle is moving in the primary travel direction;

supporting a marker by the second member;

separating the marker from the first portion of the first member; and pivotally supporting at least one of the first member by the arm for pivotal motion about a substantially vertical axis, the second member by the first member for pivotal motion about a substantially vertical axis, and the marker by the second member for pivotal motion about a substantially vertical axis.

19. The method of claim 18 further comprising supporting an adjustable rotational stop by the arm to hold at least one of the first member and the second member at a position when the vehicle is moving in the primary travel direction that creates an acute angle between the marker and the arm.

20. The method of claim 18 further comprising connecting a caster between at least two of the arm, the first member, the second member, and the marker to allow pivotal motion therebetween.

* * * * *